United States Patent
Poutet et al.

(10) Patent No.: US 7,529,299 B2
(45) Date of Patent: May 5, 2009

(54) METHOD AND SYSTEM FOR PROCESSING IMAGE SIGNALS AND COMPUTER PROGRAM PRODUCT THEREFOR

(75) Inventors: Bruno Poutet, Cadolive (FR); Massimiliano Barone, Bresso (IT); Pier Luigi Gardella, Montanaso Lombardo (IT); Danilo Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 803 days.

(21) Appl. No.: 10/938,426

(22) Filed: Sep. 10, 2004

(65) Prior Publication Data

US 2005/0117805 A1   Jun. 2, 2005

(30) Foreign Application Priority Data

Sep. 11, 2003   (EP)   ................................... 03425590

(51) Int. Cl.
   *H04B 1/66*   (2006.01)
(52) U.S. Cl. ................................. 375/240.01
(58) Field of Classification Search ............. 375/240.01
   See application file for complete search history.

(56) References Cited

U.S. PATENT DOCUMENTS

| 5,781,184 A | 7/1998 | Wasserman et al. ......... 345/202 |
| 7,043,089 B2 * | 5/2006 | Ballard ....................... 382/237 |

OTHER PUBLICATIONS

Weitzman, A., et al., "Fast Multi-Stage VQ Search for the BTC-VQ Algorithm," in *Proceedings of the 17th Convention of Electrical and Electronics Engineers in Israel*, Tel Aviv, Isreal, Mar. 5-7, 1991, pp. 182-185.

Wu, Y., et al., "Multilevel Block Truncation Coding Using a Minimax Error Criterion for High-Fidelity Compression of Digital Images," *IEEE Transactions on Communications* 41(8):1179-1191, Aug. 1993.

* cited by examiner

*Primary Examiner*—Young Lee
*Assistant Examiner*—Richard Torrente
(74) *Attorney, Agent, or Firm*—Lisa K. Jorgenson; Timothy L. Boller; Seed IP Law Group PLLC

(57) ABSTRACT

A digital video image is compressed by determining for a group of adjacent pixels the global error values that result from the available combinations of truncation and integration of data strings associated with the group of pixels. A combination of truncation and integration that produces a minimum global error value is identified and used to control compression of the individual strings of data associated with the group of pixels.

31 Claims, 2 Drawing Sheets

METHOD AND SYSTEM FOR PROCESSING IMAGE SIGNALS AND COMPUTER PROGRAM PRODUCT THEREFOR

BACKGROUND OF THE INVENTION

1. Field of the Invention

The present invention relates to techniques for the treatment of image signals.

Particular attention has been paid to the possibility of applying embodiments to compression of RGB images on 24 bits per pixel with a view to their subsequent storage in a frame buffer. The reference to this particular type of application must not, however, be understood as in any way limiting the scope of the invention, which is altogether general.

2. Description of the Related Art

In different sectors of the art there arises the need to reduce the number of bits for representing a color since some displays have a limited number of bits per color, in particular color images in graphic-display cards for personal computers and workstations, or in printers with a limited availability of colors.

For example, in the case of images in RGB format, a true-color image is made up of 8 bits for each chromatic component, for a total of 24 bits per pixel.

Known in the literature are solutions, based upon the "dithering" principle, which enable simulation of colors that are not available in the display color pallets. This result is obtained by arranging the adjacent pixels with different colors from those of the image source in a configuration such as to simulate the colors of the image source itself that are not available. This technique exploits the tendency of the human eye to mix colors when it is observing complex configurations of colors.

A typical effect of dithering may be encountered on television displays or in typographical prints. At a certain distance, the images seem to comprise many colors or many different shades or nuances of color, but when they are observed in greater detail, it is found not to be the case. For example, a television image, even though it may appear to have a continuous tone, uses only three colors set in various states of activation/deactivation. Typographical print, for example newspaper print, uses only black ink; however, the images appear to be made up of grey tones.

Fundamentally, the principle of dithering is based upon the simulation of an intermediate tone by mixing, in appropriate amounts (for example as a result of different geometrical distributions), two colors, for instance, black and white for simulation of an entire range of grey.

The prospect of developing dithering techniques that may enable a high ratio of compression with satisfactory results at the display level is today particularly felt.

For example, in 3D graphic-display cards for mobile telephones there is felt the need to provide an acceptable display, starting from image data organized in 4 or 5-6 bits per pixel (for color images), or even starting from only one bit per pixel for monochromatic displays.

BRIEF SUMMARY OF THE INVENTION

In one aspect, a method for processing digital video signals comprises: ordering pixels in an image of a digital video signal in groups of adjacent pixels; performing, for the pixels comprised in each of said groups, the operations of: truncating a respective string of bits, eliminating a given number of least-significant bits, thus generating a respective truncated string; adding to said truncated string an integration factor constituted by a power of two of a given order, thus generating a respective integrated string; and calculating first values of pixel error corresponding to the difference between said respective string and the respective truncated string and second values of pixel error corresponding to the difference between said respective string and the respective integrated string; calculating, for each of said groups of pixels, a set of values of global error comprising all the possible combinations of addition of said first and second values of pixel error on the pixels of the group; locating the value of minimum error in said set of values of global error, identifying moreover, in the combination of addition that produces said value of minimum global error, a first number of pixels, whereby the contribution to said value of minimum global error is given by said first value of pixel error, and a second number of pixels, whereby the contribution to said value of minimum global error is given by the second value of pixel error; and using, as a compressed version of the video signals represented by the pixels in the group, a first number of said truncated strings and a second number of said integrated strings that are equal to said first number of pixels and to said second number of pixels respectively, said integrated strings being subjected to truncation by the elimination of said given number of least-significant bits.

In another aspect, a system comprises a processor configured to perform the steps set forth above.

In another aspect, a computer readable media stores instructions for causing a control system to facilitate processing of a digital signal according to the method set forth above.

In another aspect, a method of compressing a digital video image comprises: identifying a first set of data strings associated with a first set of adjacent pixels in a digital video image; calculating a set of truncation error values corresponding to truncation of the first set of data strings; calculating a set of integration error values corresponding to integration of the first set of data strings; selecting a first number of truncation error values and a second number of integration error values corresponding to a first minimum total error; and generating a set of compressed data strings by: truncating a third number of data strings in the first set of data strings, wherein the third number is equal to the first number; and integrating a fourth number of data strings in the first set of data strings and truncating the integrated data strings, wherein the fourth number is equal to the second number.

In another aspect, digital video signals, such as RGB signals, are subjected to processing by ordering the pixels into groups (M) of adjacent pixels (A, B, C, D) and carrying out the operations of:

i) truncating the respective string of bits, eliminating a given number (n) of least-significant bits, thus generating a respective truncated string;

ii) adding to the truncated string an integration factor constituted by a power of two of a given order, thus generating a respective integrated string; and iii) calculating first and second values of pixel error corresponding to the difference between the respective string and the truncated string and the respective string and the integrated string, respectively.

There is calculated a set of values of global error comprising all the possible combinations of addition of the first and second values of pixel error on the group (M), then locating the value of minimum error in the set of values of global error. Once, in the combination that produces the value of minimum global error, a first and a second number of pixels have been identified whereby the contribution to the value of minimum global error is given by the first value of pixel error and by the second value of pixel error, as a compressed version of the video signals represented by the pixels in the group, there is used a first number of truncated strings and a second number of integrated strings, equal, respectively, to the first number of pixels and to the second number of pixels, with the integrated strings subjected to truncation.

BRIEF DESCRIPTION OF THE SEVERAL VIEWS OF THE DRAWINGS

Embodiments of the invention will now be described, purely by way of non-limiting example, with reference to the annexed drawings, in which.

DETAILED DESCRIPTION OF THE INVENTION

Figure 1:
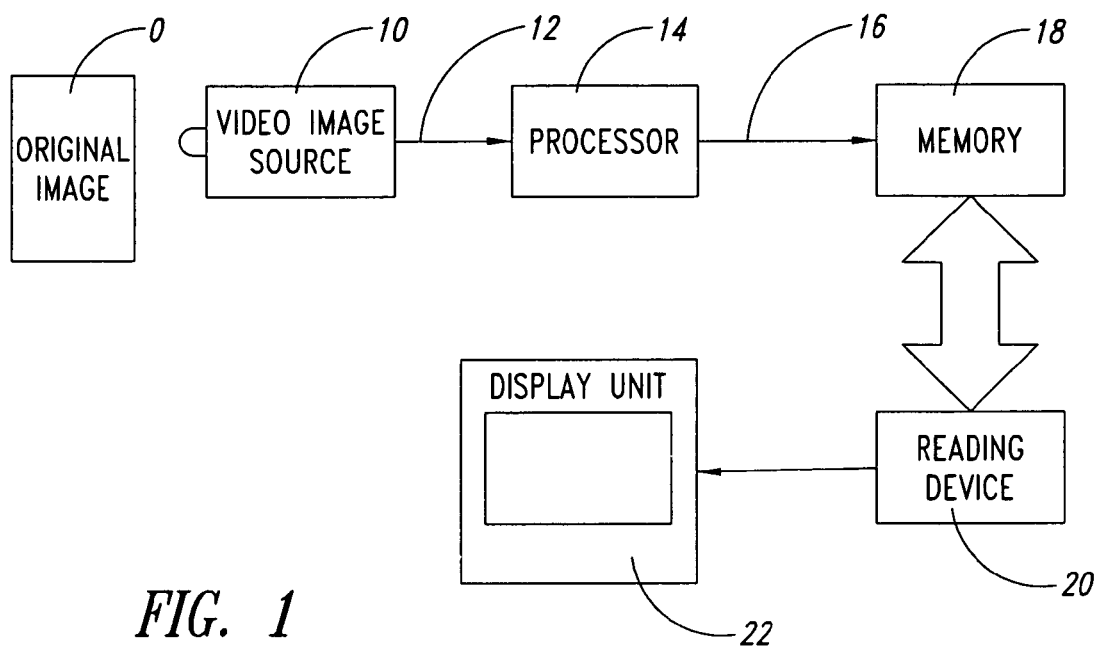
FIG. 1 is a block diagram representing a system that is able to operate according to an embodiment.

The block diagram of FIG. 1 illustrates as a whole the context of application of the invention; persons skilled in the sector will moreover appreciate that the representation of FIG. 1 constitutes just one of the possible examples of a context of application of the solution described in what follows.

The system represented in FIG. 1 comprises an original image 0 and a source of video signals 10 constituted, for example, by a television camera, a photographic camera, or a scanner that explores an "original" image, generating at its output signals 12. The signals 12 are typically constituted by digital color video signals organized according to an RGB format.

Video-image sources corresponding to the description provided herein for the source 10 are widely known to the art, this rendering altogether superfluous a more detailed description herein.

The signals 12 are supplied to a computer such as, for example, a processor 14, which (operating according to the criteria described in greater detail in what follows) generates at its output video signals 16 corresponding to the signals 12 supplied to its input but subjected to an operation of compression with a view to their subsequent storage in a memory 18.

The processor 14 can be constituted either by a dedicated processor or else by a processor of a general-purpose type (for example, of the DSP type) configured—according to criteria in themselves known, i.e., by loading of a corresponding computer product—for implementing the processing operations described in greater detail in what follows.

The reference number 20 indicates in the diagram of FIG. 1 a reading device of any known type. The device is able to gain access to the memory 18 by reading the video signals stored therein and supplying them to a display unit 22 represented, for example, by a liquid-crystal display.

Those of skill in the art will of course appreciate that the examples provided previously are only some of the practically infinite examples of possible exploitation of a processing technique of the type described herein.

For a better understanding of the embodiments of the solution described herein, it is useful to recall in brief and as an introduction the outstanding characteristics of various traditional dithering techniques that may be used for image compression.

A first technique is the "clamping" technique.

This is the simplest dithering technique, which enables passage, for instance, from 24 bits per pixel to 12 bits per pixel simply by subjecting to truncation each 8-bit string representing one of the RGB components of a pixel. The action of truncation leads to elimination of the 4 least-significant bits of each RGB component, which leaves just the 4 most-significant bits. In practice, the clamping function is carried out in a very simple way by implementing, in the stage of compression of the image, a shift to the right aimed at eliminating the least-significant bits (it will be appreciated that the previous reference to 4 bits is provided purely by way of example).

The above technique is also suited for being implemented in a differentiated way on the various chromatic components, for example eliminating the three least-significant bits of the red (R) and blue (B) components and only two bits of the green (G) component, which is usually the one to which the human eye is most sensitive.

The final result of the above operation is, in the first place, a constructed image generally darker than of the original one. Furthermore, the final result may be very poor in certain types of image, for example images with a continuous color gradient.

A second technique is the one known as "integer rounding".

This is basically an improvement of the clamping technique described previously. After truncation of the n least-significant bits, if the value subjected to truncation is greater than $(2^n-1)/2$, there is added $2^n$ to the value stored. In this way, the difference between the value of each component is reduced by a factor two prior to compression and following upon decompression.

Also in this case the quality that may be achieved is as a whole modest: for standard images, there is a slight improvement with respect to the pure and simple clamping technique. For other images there is practically no difference between the clamping/truncation technique and the integer-rounding technique.

Yet a further variant improvement of the clamping technique is the one known as "noisy clamping".

In this case, prior to truncation of the least-significant bits, there is added to the value of each RGB component a random number generated using any known method (for example with the function known as rand( )). As compared to the previous techniques, the results are better but, as a whole, the final images are more blurred precisely as a result of the application of the noise component. Furthermore, the solution is inevitably sensitive to the technique adopted for generating the pseudorandom noise component. From other points of view, the result achieved appears appreciable better since the addition of the noise component emphasizes the high-frequency components, rendering them clearer from certain standpoints. Furthermore, the addition of noise is useful for the purposes of reproduction of images with very low frequency, where the aspect of the absence of artefacts becomes more important than noise. As a whole, this technique proves preferable for fixed or static images, whereas, instead, for moving sequences the result appears less satisfactory.

Yet another known technique is referred to as "ordered dithering".

This is a technique that envisages carrying out a thresholding function, implemented by comparing each value of pixel p with a threshold t. According to the outcome of the comparison, there is attributed to the pixel one of two values, each of which represents an available color. The threshold can be a fixed one or else depend upon the position of the pixel both at a local level and at a global level in the image. Frequently, the use of a fixed threshold gives rise to modest results, whereas with the use of thresholds that vary according to the position much better results are obtained. The technique can be further improved by resorting to threshold arrays containing a regular distribution of fields of thresholds for each pixel position.

As a whole, the results are widely superior to those achieved using all the other techniques considered previously, also because addition of noise is not envisaged.

A further known dithering technique is the one that goes by the name of Floyd-Steinberg method. As compared to the thresholding techniques referred to previously, the Floyd-Steinberg method is based upon a criterion of error diffusion (or dispersion): the rounding error associated to each pixel is propagated to the adjacent pixels with a view to it possible compensation.

Basically, the error-dispersion technique operates in such a way that, for each point of the image, there is identified in the first place the closest available color. Once the difference between the value of the image and the available color has been calculated, the corresponding error values are distributed over the adjacent pixels that have not yet been treated. When these further pixels are to be treated, there are added thereto the distributed errors starting from the preceding ones, a clipping action being carried out in order to remain within the range of the admissible values; then the process proceeds in a similar manner on the rest of the image.

For a general illustration of the Floyd-Steinberg method, useful reference may be made to the volume by J. D. Foley, A. V. Dam, and S. K. Feiner: "Introduction to Computer Graphics", Addison Wesley Pub. Co., 1st Ed., August 1993.

There exist various solutions for error distribution and different ways of exploring the image. As compared to all the other traditional solutions considered, the Floyd-Steinberg method yields the best results. Since it is an intrinsically more complex technique, it is, however, slower to implement.

Figure 2:
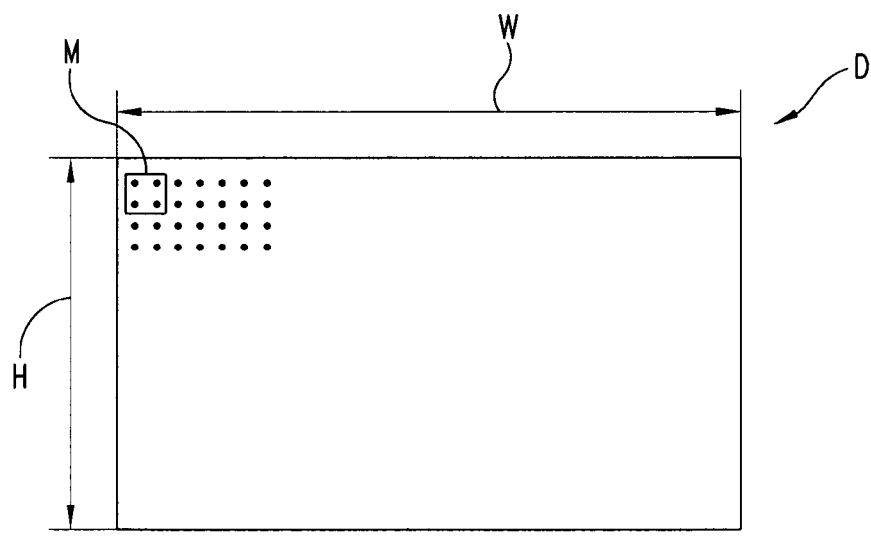
FIGS. 2 and 3 are two schematic representations illustrating operation of embodiments described herein.

Passing now to an examination—with reference to FIG. 2—of an embodiment of the solution described herein, there is envisaged operating on a digitalized image D having a height H and a width W, in which the visible black points in FIG. 2 indicate the individual pixels in the RGB format.

The reference M indicates a set of pixels constituted by a 2×2 array, i.e., ones comprising four pixels.

In what follows, embodiments of the solution described herein will be illustrated assuming scanning of the image D with an array comprising 4 pixels A, B, C, D (see FIG. 3), proceeding in an ordered way from left to right and from the top downwards (i.e., in lexicographic order). Furthermore, the functions described in what follows are generally applied in parallel for the red component and the green and blue components. In particular, there is envisaged application of a function of minimization of the global error for each array of the image split into chromatic components.

Persons skilled in the sector will moreover appreciate clearly that these hypotheses are made primarily by way of example and do not have a character in any way limiting the scope of the invention.

Figure 3:
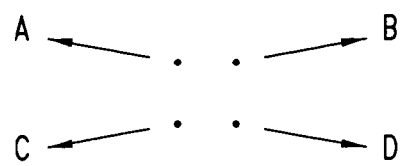

If we assume ordering each chromatic component (RGB) as illustrated in FIG. 3 and we assume that—in the context of the image—A has co-ordinates (x, y), we shall then have that B has co-ordinates (x+1, y), C has co-ordinates (x, y+1), and D has co-ordinates (x+1, y+1).

Upon the hypothesis that at start-up each component R, G and B is encoded on 8 bits (true color), there will now be considered the case in which the aim is to achieve a ratio of compression of the order of n/8, thus removing n bits of the 8 bits that make up each component.

Of course, it is also possible to proceed by changing the number of bits eliminated in different manners for the various components. For reasons of simplicity, there will be considered in what follows the case of a uniform treatment, and in particular reference will be made to an example in which there are removed 4 bits of the 8 bits that make up each component, thus achieving a compression ratio of 50%.

We shall therefore assume proceeding, in the first place, by truncating the n=4 least-significant bits of each component, setting them at 0, in a way independent of their original value.

Proceeding in this way, from an original RGB chromatic component made up of an 8-bit string, such as A=1010 1010, there is obtained a component/truncated string At given by 1010 (0000).

Figure 4:
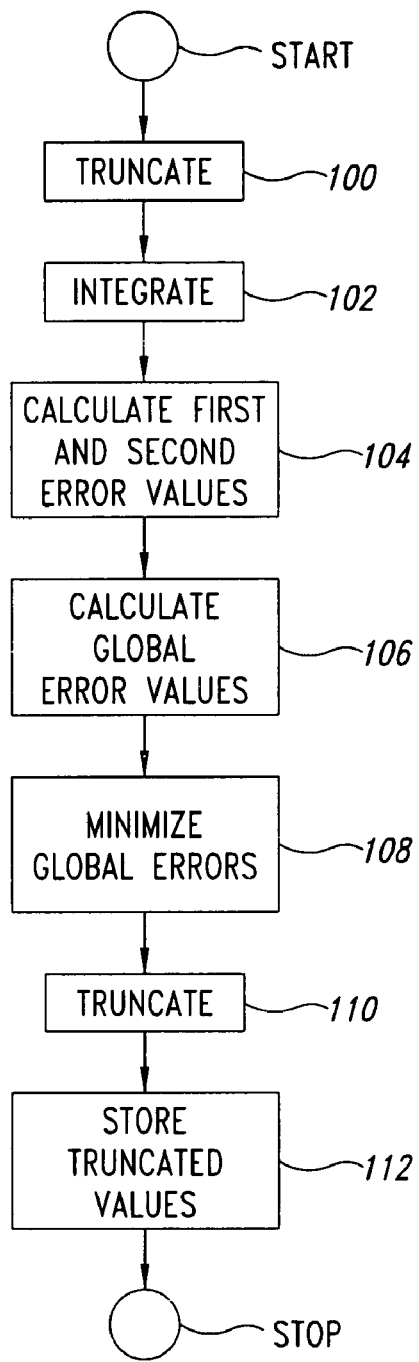
FIG. 4 is a flowchart illustrating the mode of operation of an embodiment described herein.

This corresponds, in the flowchart of FIG. 4, to step 100, which follows the step of state of the procedure: operating on the 4 pixels A, B, C and D of the array (FIG. 3) there will hence be obtained four components/truncated strings At, Bt, Ct, Dt.

In a subsequent step designated by 102, the value $2^n$ is added to each value subjected previously to truncation, i.e., in the present case $2^4=16$.

The overall result, referred to sample A seen previously will then be that of obtaining from the truncated string At seen previously, 1010 0000, an "integrated" string Ai=1011 0000.

Of course what has been said with reference to sample A applies also to the other samples B, C, D so that there will be available corresponding integrated strings Bi, Ci, Di.

At this point, in a step designated by 104, for all of the samples A, B, C, D, there is calculated the difference between the original values A, B, C, D and:

on the one hand, the truncated values At, Bt, Ct, Dt, thus obtaining first difference/error values; and on the other hand, the integrated values Ai, Bi, Ci, Di, thus obtaining second difference/error values.

In other words, in step 104 there are calculated the values $$\Delta a = At - A \text{ or } \Delta a = Ai - A = At - A + 2^4$$

$$\Delta b = Bt - B \text{ or } \Delta b = Bt - B + 2^4$$

$$\Delta c = Ct - C \text{ or } \Delta c = Ct - C + 2^4$$

$$\Delta d = Dt - D \text{ or } \Delta d = Dt - D + 2^4$$

Subsequently, in a step designated by 106, there is calculated a set of values of global error ($\Delta$) comprising all the possible combinations of addition of said first and second pixel error values on the pixels of the group.

Albeit referring distinctly to the truncated values At, Bt, Ct, Dt and to the integrated values Ai, Bi, Ci, Di, the aforesaid combinations are in actual fact only n+1 (i.e., in the example illustrated herein, five) different possibilities that can be expressed as follows:

$$\Delta = (At-A)+(Bt-B)+(Ct-C)+(Dt-D) \qquad 1.$$

$$\Delta = (At-A)+(Bt-B)+(Ct-C)+(Dt-D)+1*2^4 \qquad 2.$$

$$\Delta = (At-A)+(Bt-B)+(Ct-C)+(Dt-D)+2*2^4 \qquad 3.$$

$$\Delta = (At-A)+(Bt-B)+(Ct-C)+(Dt-D)+3*2^4 \qquad 4.$$

$$\Delta = (At-A)+(Bt-B)+(Ct-C)+(Dt-D)+4*2^4 \qquad 5.$$

In this regard, it is to be noted that, for example, $\Delta a = At - A$ is calculated with sign and may thus also be negative; otherwise, $\Delta$ would be always positive and the corresponding minimum would be always equal to $\Delta a$.

An embodiment of the solution described herein minimizes the global error of the array, by taking the lowest value among those considered previously.

Thus, in the case where the value previously designated by 1 is the minimum value, the operation is performed of truncating all the pixels of the four least-significant bits. In the case where the minimum is represented by the value designated by 2, $2^4$ is added only to one pixel in the array, and the other three are truncated. In the case where the minimum is represented by the value designated by 3, $2^4$ is added only to two pixels in the array, and the other two are truncated. In the case where the minimum is represented by the value designated by 4, $2^4$ is added only to three pixels within the array, and the remaining one is truncated. Finally, in the case where the minimum is represented by the value designated by 5, $2^4$ is added to all four pixels in the array, without making any truncation.

Operation of one embodiment for choosing the pixels to which to add $2^4$ (or, in general, $2^n$) is illustrated in what follows.

Supposing, for example, that the minimum value of $\Delta$ is represented by the value designated by 3 seen previously, in this case, as has already been seen, for two pixels there is stored in the memory 18 the truncated value, whilst for the other two pixels there is stored the truncated value increased, however, by $2^4$.

To choose which bits are subjected to truncation and to which bits there are added $2^4$ there can be applied, for example, the technique of rounding to the closest integer value already described previously.

In a step designated by 108 in the flowchart of FIG. 4, the system then seeks the two pixels in which the number represented by the 4 least-significant bits is greater than $2^{n-1}=2^{4-1}=8$.

Next, in a step 110, all the samples thus obtained are subjected to truncation of the four least-significant bits before being stored in the memory 18 in a step 112.

A=1010 1010
B=1000 0000
C=1110 0011
D=1011 1000

In the memory 18 there are stored, as values deriving from the action of compression, the following values:

$a_t$=1011
$b_t$=1000
$c_t$=1110
$d_t$=1100

If there are insufficient pixels to verify this condition, pixels in the array are taken in a random way, for example in the following way:

A=1010 1010
B=1000 0000
C=1110 0011
D=1011 0111

Hence, in the memory 18 there are stored, as values deriving from the action of compression, the following values:

$a_t$=1011
$b_t$=1001
$c_t$=1110
$d_t$=1011 where $2^4$ has been added to A and B but not to C and D. This choice is made in a random way prior to proceeding to storage in the memory 18.

Thus, for each component in the memory 18, there are stored only the 4 most-significant bits, and a compression ratio of 50% is achieved.

In the stage of decompression the simplest solution consists simply of reading the compressed signals from the memory 18 and decompressing them by adding 4 least-significant bits all equal to 0.

A possible variant embodiment of the solution described herein envisages mixing the solution described previously with an error-diffusion technique.

In this case, the minimum global error in the current array (for example a 2×2 array) is distributed over the subsequent global error in the array taken into consideration immediately after in the image.

The solution is structurally identical to the one described previously, with the difference that, in this case, there is calculated the minimum value between the five values illustrated below:

$\Delta_n = \Delta_{n-1} + \Delta a + \Delta b + \Delta c + \Delta d$ $\Delta_n = \Delta_{n-1} + \Delta a + \Delta b + \Delta c + \Delta d + 1*2^4$ $\Delta_n = \Delta_{n-1} + \Delta a + \Delta b + \Delta c + \Delta d + 2*2^4$ $\Delta_n = \Delta_{n-1} + \Delta a + \Delta b + \Delta c + \Delta d + 3*2^4$ $\Delta_n = \Delta_{n-1} + \Delta a + \Delta b + \Delta c + \Delta d + 4*2^4$ where $\Delta_{n-1}$ is the minimum global error determined for the preceding array in the process of scanning of the image (of course, with reference to the same chromatic component).

To evaluate the quality of the results that can be achieved with the solution described herein (and to decide, for example, adoption thereof preferably with respect to other known solutions in a so-called graphic pipeline), either a visual evaluation of the quality of the image or a calculation of the peak signal-to-noise ratio (PSNR) may be resorted to.

Usually, the peak signal-to-noise ratio is defined with reference to a parameter of mean-square error (MSE) defined according to the relation:

$$MSE = \frac{1}{MN} \sum_{y=1}^{M} \sum_{x=1}^{N} [I(x, y) - I'(x, y)]^2$$

where M and N are, respectively, the height and the width of the image, I(x, y) is the original image, I'(x, y) is the image compressed and then decompressed which is to be compared with the original.

The peak signal-to-noise ratio PSNR is defined—in the example considered herein—as $$PSNR = 20 \log_{10}\left(\frac{255}{\sqrt{MSE}}\right)$$

Typical values of PSNR are usually comprised between 20 dB and 48 dB, preferably expressed with two decimal figures (for example 36.27 dB). A value of 48 dB identifies practically a situation in which the human eye is not able to appreciate visual artefacts. A better compression leads to a lower value of MSE which, in turn, leads to a higher PSNR.

The tests conducted by the present applicant show that embodiments of the solution described herein enable a better quality to be obtained as compared to the ordered-dithering technique and the Floyd-Steinberg method. Visual examination of the results does not lead to identifying appreciable artefacts, and in any case the technique according to the present invention provides better results than do the techniques that envisage addition of pseudorandom noise, in particular in moving sequences.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Of course, without prejudice to the principle of the invention, the details of construction and the embodiments may vary widely with respect to what is described and illustrated herein, without thereby departing from the scope of the present invention, as defined in the annexed claims.

This applies in particular, but not exclusively, to the possibility of applying the technique described previously on arrays of a size larger than 2×2 and, for example, to sets of adjacent pixels that are not arranged in matrix form (either a square matrix or a rectangular matrix), but in different conformations (for example, cross-like conformations): it will be appreciated that, apart from the greater difficulty of description, the solution described previously is identically applicable also to these possible variant embodiments.

The invention claimed is:

1. A method for processing a digital video signal using a digital video processing system having at least one processing device, the method comprising:
   ordering pixels in an image of the digital video signal in groups of adjacent pixels;
   performing, for the pixels comprised in each of said groups, the operations of:
   truncating a respective string of bits, eliminating a given number of least-significant bits, thus generating a respective truncated string;
   adding to said truncated string an integration factor constituted by a power of two of a given order, thus generating a respective integrated string;
   calculating using the at least one processing device, first values of pixel error corresponding to a difference between said respective string and the respective truncated string and second values of pixel error corresponding to a difference between said respective string and the respective integrated string;
   calculating using the at least one processing device, for each of said groups of pixels, a set of values of global error comprising all the possible combinations of addition of said first and second values of pixel error on the pixels of the group;
   locating using the at least one processing device, a value of minimum error in said set of values of global error, identifying moreover, in the combination of addition that produces said value of minimum global error, a first number of pixels, whereby the contribution to said value of minimum global error is given by said first value of pixel error, and a second number of pixels, whereby the contribution to said value of minimum global error is given by the second value of pixel error; and
   using, as a compressed version of the video signals represented by the pixels in the group, a first number of said truncated strings and a second number of said integrated strings that are equal to said first number of pixels and to said second number of pixels respectively, said integrated strings being subjected to truncation by the elimination of said given number of least-significant bits.

2. The method according to claim 1 wherein said first number of integrated strings is used for representing the pixels in said group whereby the least-significant bits of the respective string of bits is greater than a given threshold.

3. The method according to claim 2 wherein said threshold is given by a power of two of order lower by one unit with respect to said given order.

4. The method of claim 1 wherein identifying a first number of pixels and a second number of pixels comprises choosing, at least in part, in a random way, the pixels in said group in which, as compressed version, there is used the respective truncated string and the respective integrated string subjected to truncation.

5. The method of claim 1 wherein the digital video signal comprises a plurality of respective strings of bits, each of which is representative of a respective chromatic component of a pixel, further comprising repeating the steps according to claim 1 for each of the strings of bits of said plurality.

6. The method according to claim 5 wherein said given number of least-significant bits is chosen equal for all the chromatic components of said plurality.

7. The method according to claim 5 wherein said given number of least-significant bits is chosen different for the chromatic components of said plurality.

8. The method according to claim 1 wherein said given order is chosen equal to said given number.

9. The method of claim 1, further comprising repeating the sequence of steps of claim 1, in sequence for successive groups of pixels of said video signal, according to a determined scanning order.

10. The method according to claim 9 wherein said scanning order is a lexicographic scanning order.

11. The method according to claim 9, further comprising adding to the possible combinations of addition comprised in said set of values of global error, calculated for a determined group of pixels in said ordered sequence, the value of minimum global error located for the preceding group of pixels in said scanning order.

12. The method of claim 1 wherein said groups of pixels comprise arrays of pixels.

13. The method of claim 12 wherein said groups of pixels comprise square matrices of pixels.

14. The method of claim 1 wherein said groups of pixels comprise a number of pixels equal to four.

15. The method of claim 1 wherein said digital video signals are signals in RGB format.

16. A system for processing digital video signals, comprising at least one processing device configured for implementing the steps of:
   ordering pixels in an image of a digital video signal in groups of adjacent pixels;
   performing, for the pixels comprised in each of said groups, the operations of:
   truncating a respective string of bits, eliminating a given number of least-significant bits, thus generating a respective truncated string;
   adding to said truncated string an integration factor constituted by a power of two of a given order, thus generating a respective integrated string; and
   calculating first values of pixel error corresponding to the difference between said respective string and the respective truncated string and second values of pixel error corresponding to the difference between said respective string and the respective integrated string;
   calculating, for each of said groups of pixels, a set of values of global error comprising all the possible combinations of addition of said first and second values of pixel error on the pixels of the group;
   locating a value of minimum error in said set of values of global error, identifying moreover, in the combination of addition that produces said value of minimum global error, a first number of pixels, whereby the contribution to said value of minimum global error is given by said first value of pixel error, and a second number of pixels, whereby the contribution to said value of minimum global error is given by the second value of pixel error; and using, as compressed version of the video signals represented by the pixels in the group, a first number of said truncated strings and a second number of said integrated strings that are equal to said first number of pixels and to said second number of pixels respectively, said integrated strings being subjected to truncation by the elimination of said given number of least-significant bits.

17. The system of claim 16 wherein said processing device is configured for using said first number of integrated strings for representing the pixels in said group so that the least-significant bits of the respective string of bits is greater than a given threshold.

18. The system according to claim 17 wherein said threshold is given by a power of two of order lower by one unit with respect to said given order.

19. The system of claim 16 wherein said processing device is configured for choosing, at least in part, in a random way, the pixels in said group, in which, as a compressed version, there are used the respective truncated string and the respective integrated string subjected to truncation.

20. The system of claim 16 wherein pixels of the image have associated to them a plurality of respective strings of bits each representative of a respective chromatic component of a pixel, wherein said processing device is further configured to repeat the steps according to claim 16 for each of the strings of bits of said plurality.

21. The system according to claim 20 wherein said processing device is further configured to choose said given number of least-significant bits equal for all the chromatic components of said plurality.

22. The system according to claim 20 wherein said processing device is configured to choose said given number of least-significant bits in a different way for the chromatic components of said plurality.

23. The system according to claim 16 wherein said processing device is configured to choose said given order equal to said given number.

24. The system according to claim 16 wherein said processing device is configured for operating in sequence for subsequent groups of pixels of said image according to a given scanning order.

25. The system according to claim 24 wherein said scanning order is a lexicographic scanning order.

26. The system according to claim 24 wherein said processing device is configured for adding to the possible combinations of addition comprised in said set of values of global error calculated for a given group of pixels in said ordered sequence, the value of minimum global error located for the preceding group of pixels in said scanning order.

27. The system according to claim 16 wherein said groups of pixels comprise arrays of pixels.

28. The system according to claim 27 wherein said groups of pixels comprise square matrices of pixels.

29. The system according to claim 16 wherein said groups of pixels comprise a number of pixels equal to four.

30. The system according to claim 16 wherein said digital video signals are signals in RGB format.

31. A computer readable memory medium encoded with instructions for causing a computer system to process a digital video signal according to the steps comprising:

ordering pixels in an image of a digital video signal in groups of adjacent pixels;

performing, for the pixels comprised in each of said groups, the operations of:

truncating a respective string of bits, eliminating a given number of least-significant bits, thus generating a respective truncated string;

adding to said truncated string an integration factor constituted by a power of two of a given order, thus generating a respective integrated string; and calculating first values of pixel error corresponding to the difference between said respective string and the respective truncated string and second values of pixel error corresponding to the difference between said respective string and the respective integrated string;

calculating, for each of said groups of pixels, a set of values of global error comprising all the possible combinations of addition of said first and second values of pixel error on the pixels of the group;

locating the value of minimum error in said set of values of global error, identifying moreover, in the combination of addition that produces said value of minimum global error, a first number of pixels, whereby the contribution to said value of minimum global error is given by said first value of pixel error, and a second number of pixels, whereby the contribution to said value of minimum global error is given by the second value of pixel error; and using, as a compressed version of the video signals represented by the pixels in the group, a first number of said truncated strings and a second number of said integrated strings that are equal to said first number of pixels and to said second number of pixels respectively, said integrated strings being subjected to truncation by the elimination of said given number of least-significant bits.

* * * * *